Sept. 29, 1964  W. L. TAYLOR ETAL  3,150,913
PORTABLE RECORDER
Filed Dec. 7, 1962  2 Sheets-Sheet 1
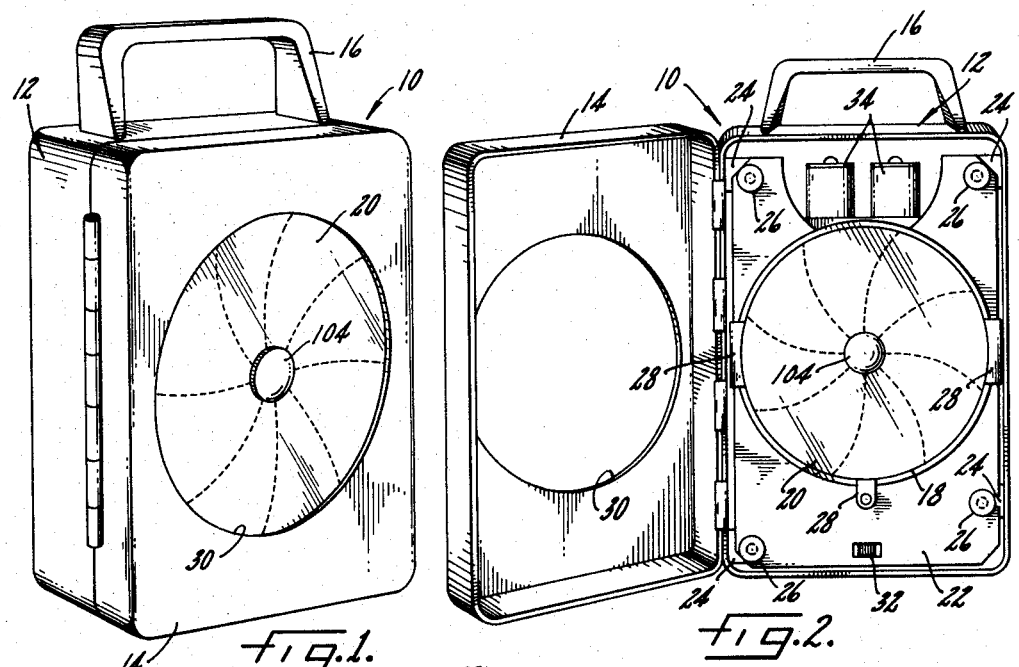
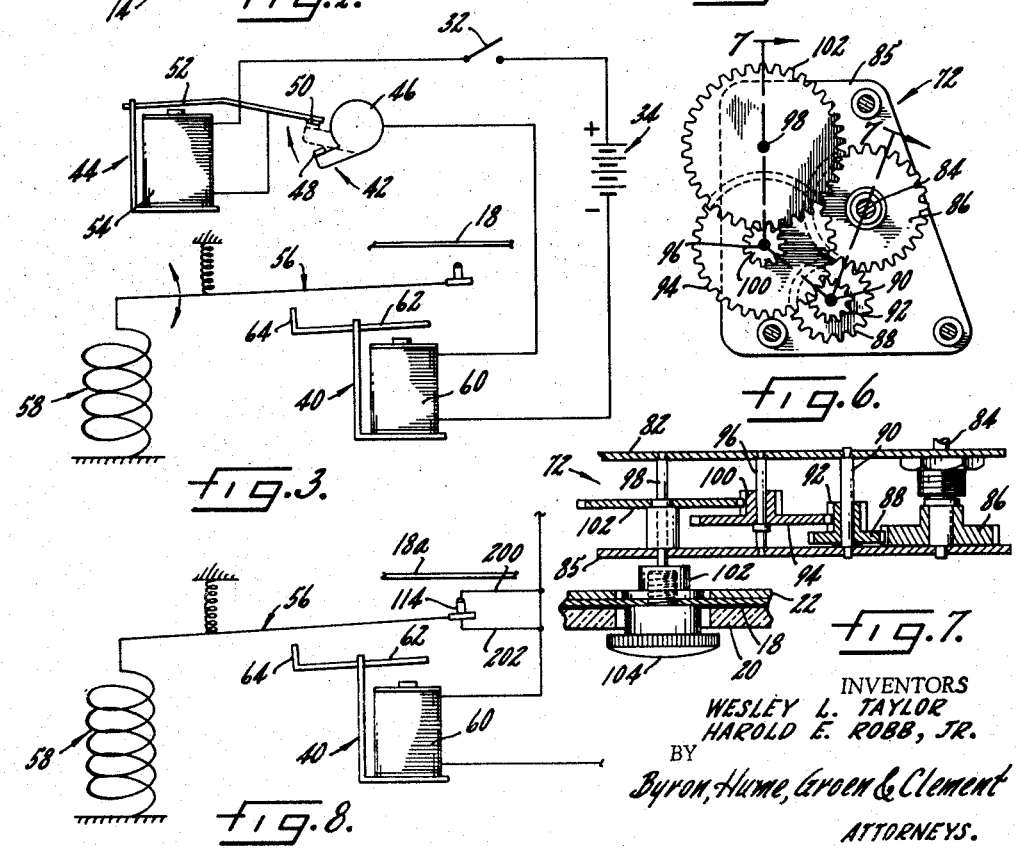
INVENTORS
WESLEY L. TAYLOR
HAROLD E. ROBB, JR.
BY
Byron, Hume, Groen & Clement
ATTORNEYS.

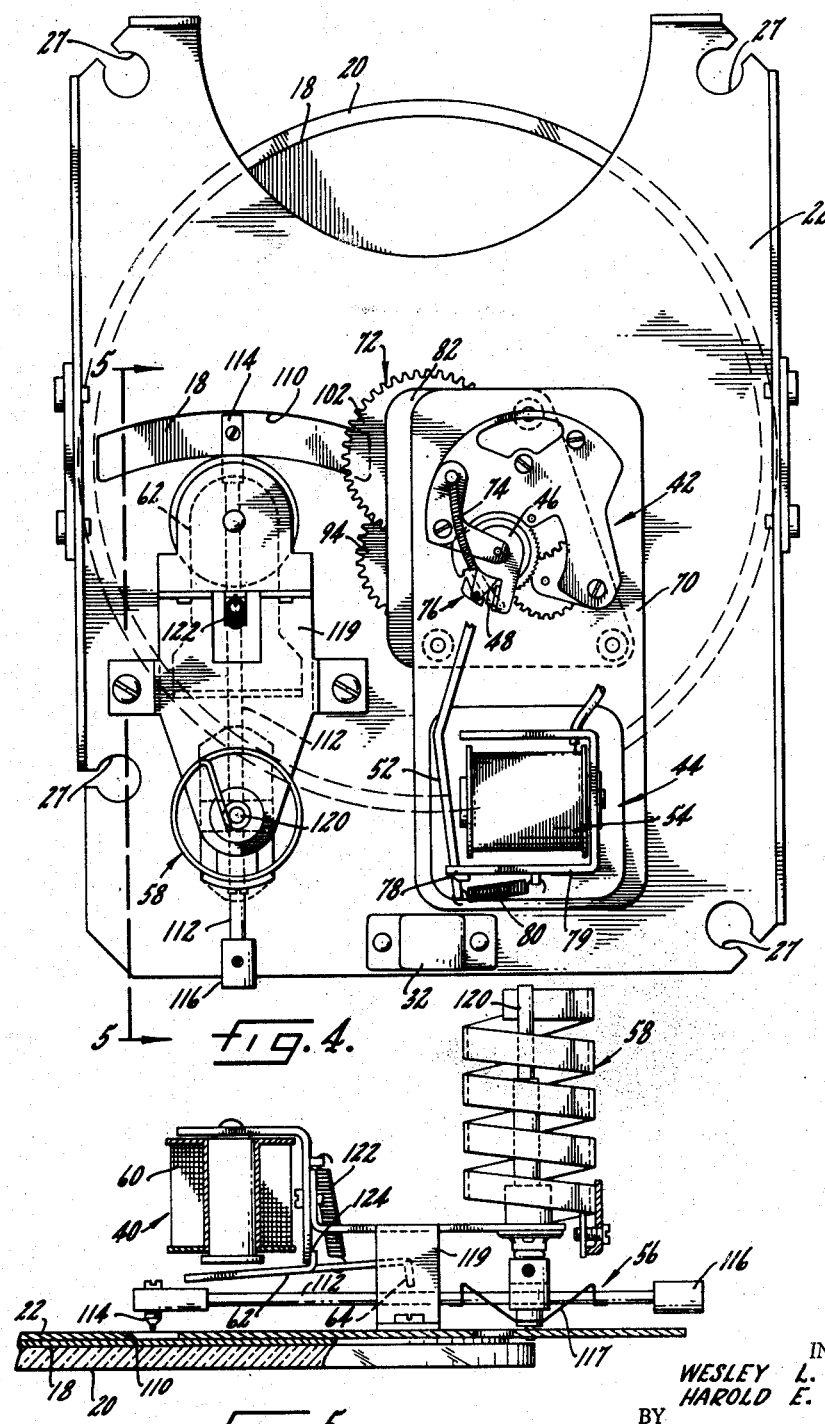

United States Patent Office 3,150,913
Patented Sept. 29, 1964

3,150,913
PORTABLE RECORDER
Wesley L. Taylor, Glenview, and Harold E. Robb, Jr., Elk Grove Village, Ill., assignors to The Powers Regulator Company, Skokie, Ill., a corporation of Illinois
Filed Dec. 7, 1962, Ser. No. 243,121
10 Claims. (Cl. 346—80)

This invention relates to a recorder for recording any sensed condition, such as temperature, pressure and the like.

Recorders adapted for chart recording of temperature, pressure or other sensed conditions on a time basis are, of course, well known in the art. Heretofore, however, these recorders have been large, cumbersome devices which were not suitable as portable recorders. Furthermore, these recorders required complicated circuitry to effect the desired recording.

It is therefore an object of the present invention to provide a recorder for any sensed condition, such as temperature, pressure or the like, which is composed of a minimal number of components.

It is a further object of the present invention to provide such a chart recorder wherein the chart moves freely without being impeded by other components of the recorder.

It is a further object of the present invention to provide a recorder for chart recording on a time basis any sensed condition, such as temperature, pressure or the like, wherein a relatively small driving means for the chart may be employed.

It is still another object of the present invention to provide a recorder for chart recording on a time basis any sensed condition wherein said recorder may be powered by a small battery or the like.

It is still a further object of the present invention to provide a portable recorder for chart recording any sensed condition, such as temperature, pressure or the like.

These and other objects more apparent hereinafter are achieved in accordance with the present invention which provides a recorder adapted to record on a time basis a sensed condition, such as temperature, pressure or the like. The recorder of the present invention includes stylus means which contact a recording chart only when the sensed condition is to be recorded. The chart therefore moves freely without being impeded by friction between the stylus means and the chart. In this manner the chart may be driven by a small clock mechanism. The stylus means and the clock mechanism are actuated and re-wound, respectively, by an electrical circuit energized by a battery or other suitable means.

The invention, both as to its organization and method of operation taken with further objects and advantages thereof, will best be understood by reference to the following description taken in conjunction with the accompanying drawings, in which:

FIGURE 1 is a perspective view of a portable recorder embodying the features of the present invention;

FIGURE 2 is a perspective view of the recorder shown in FIGURE 1 with the lid of the recorder open;

FIGURE 3 is a schematic diagram of an electrical circuit and its components utilized in the recorder illustrated in FIGURE 1;

FIGURE 4 is a bottom plan view of a frame utilized in the recorder of FIGURE 1, this frame supporting the clock mechanism, recording chart, stylus means, stylus actuation means and sensing device of the recorder;

FIGURE 5 is a side view of the stylus means, stylus actuation means and sensing device taken along line 5—5 of FIGURE 4;

FIGURE 6 is a bottom plan view of a gear train assembly utilized in the portable recorder of FIGURE 1 to transmit torque from the clock mechanism to the chart;

FIGURE 7 is a cross-sectional view of the gear train assembly shown in FIGURE 6 taken along line 7—7 of FIGURE 6; and FIGURE 8 is a fragmentary schematic view of an electrical circuit and its components of a modification of the present invention.

Referring to the drawings, and more particularly to FIGURES 1 and 2, there is illustrated a portable recorder embodying the features of the present invention and indicated generally by reference numeral 10. The recorder 10 includes a casing 12 with a pivotal lid 14 and a handle 16 by which the portable recorder 10 may be carried. As seen in FIGURE 2, a rotatable recording chart 18 is positioned between a frame 22 and a circular-shaped glass plate 20 fixedly secured by clamping means 28 to the frame 22. The clamping means 28 hold the glass plate 20 in spaced relationship with respect to the frame 22 so that the plate 20 does not rest upon the chart 18. The sensed condition is recorded on the recording chart 18 so as to be visible upon an inspection of the chart 18. The lid 14, which is normally closed when the recorder 10 is in use, is provided with an opening 30 through which the chart 18 may be seen.

The frame 22 is supported by brackets 24 fixedly secured to the interior of the casing 12. Outwardly extending rubber mountings or the like 26 are fixedly mounted upon the brackets 24. The rubber mountings 26 slide into slots 27 (FIGURE 4) of the frame 22 so that the frame 22 is resiliently held in position in the casing 12. In this manner the frame 22, which supports most of the components of the recorder 10 as will be apparent hereinafter, is cushioned from blows and the like which may accidentally be inflicted upon the casing 12.

The recorder 10 is powered by batteries 34 mounted on the bottom of the casing 12 and seen in FIGURE 2. Generally the lid 14 of the casing 12 is opened merely to replace the recording chart 18 or the batteries 34, to actuate an on-off switch 32 mounted on the frame 22 or to maintenance the recording apparatus housed in the casing 12. It will be understood that with the lid 14 open the frame 22 may be removed from the casing 12 by disengaging the rubber mountings 26 from the slots 27. This may be effected by lateral movement of the frame 22.

Referring to FIGURE 3 the general operation of the recorder 10 will be discussed in greater detail by reference to this schematic diagram of the components and electrical circuit employed in the recorder 10. The recorder 10 is driven by the batteries 34 and is adapted to record, by a stylus means 56 striking the recording chart 18, a sensed condition on a time basis. In this instance the sensed condition is the temperature sensed by a temperature spiral means 58, which are well known in the art. It will be understood that recording environmental temperature is merly illustrative and that the recorder 10 may be employed to record on a time basis pressure, radiation, light and the like by substituting suitable sensing means for the temperature spiral 58. As will be more apparent hereinafter, the temperature spiral 58 controls the position of the stylus means 56 in order that the temperature is properly indicated on the chart 18 which has been suitably calibrated for the particular conditions to be recorded.

The chart 18 is driven or rotated by a mechanical clock mechanism indicated generally by reference numeral 42. The clock mechanism 42 must be re-wound periodically to continually drive the chart 18. To these ends the clock mechanism 42 has a rotatable re-wind arm means 46 with an electrical contact 48 on its free end.

Re-winding the clock mechanism 42 and actuating the stylus means 56, the latter causing the temperature to be recorded on the chart 18, is effected by a re-wind actuation means, indicated generally by reference numeral 44, and a stylus actuation means, indicated generally by reference numeral 40, respectively. The re-wind actuation means 44 includes an electrical solenoid 54 and a pivotable actuation arm 52 with an electrical contact 50 on its free end. The contact 50 is positioned to be aligned with and engage the contact 48 of the re-wind arm means 46 when the clock mechanism 42 needs re-winding. When the clock mechanism 42 is wound the re-wind arm means 46 is in the position shown in solid lines in FIGURE 3. As the clock mechanism 42 unwinds the arm means 46 rotates in a clockwise direction until the contacts 48 and 50 engage. The position of the arm means 46 at that instant is shown in dotted lines in FIGURE 3. When the contacts 48 and 50 engage an electrical circuit, to be discussed in more detail hereinafter, is completed whereby the solenoid 54 is energized. This causes the actuation arm 52 to be pivoted rapidly and with great force in a clockwise direction when viewing FIGURE 3 causing the re-wind arm means 46 to be rotated in a counter-clockwise direction. Because the actuation arm 52 moves with great force and has restricted rotational movement while, comparatively speaking, the re-wind arm means 46 may rotate without restriction, the re-wind arm means 46 will rotate farther than the arm 52. The rotational movement of the arm means 46 winds the clock mechanism 42. Furthermore, because the arm means 46 will rotate farther than the arm 52 and in a different direction the contacts 48 and 50 will separate and break the circuit. Accordingly, the solenoid 54 is de-energized and the arm 52 returns to its normal position, which is shown in FIGURE 3.

The stylus actuation means 40 includes an electrical solenoid 60 and a pivotable stylus actuation arm 62 having an end 64 adapted to engage and move the stylus means 56 to strike the recording chart 18 and leave a visible dot or mark thereon indicating the sensed temperature at that particular time. This is effected when the circuit is completed and the solenoid 60 thereby energized. Upon energizing the solenoid 60 the actuation arm 62 pivots rapidly causing the end 64 of the arm 62 to engage the stylus means 56 and move it to strike and mark the recording chart 18. As will be more apparent hereinafter, the solenoid 60 is energized for only a very short period of time and upon being de-energized the arm 62 returns to its normal position, i.e., spaced from the stylus means 56 as illustrated in FIGURE 3. The stylus means 56 therefore leaves only a dot or small mark on the chart 18 and does not normally rest on the chart 18. The stylus means 56 will strike the chart 18 frequently enough, however, so that a solid temperature line is imprinted on the chart 18.

In accordance with the present invention re-winding of the clock mechanism 42 and actuation of the stylus means 56 is effected through a single electrical circuit illustrated in FIGURE 3. In this circuit there are connected in series, by suitable electrical wires, the on-off switch 32, the battery 34, the solenoid 60, the clock mechanism 42, the re-wind actuation arm 52 and the solenoid 54. When the switch 32 is closed by moving the button into the "on" position the recorder 10 begins to operate. If the recorder 10 has not been operated for sometime, the clock mechanism 42 will have run down so that the contacts 50 and 48 of the re-wind actuation arm 52 and the re-wind arm means 46, respectively, engage one another. The circuit will therefore be completed and the arm 52 will pivot in the clockwise direction and force the re-wind arm means 46 to rotate in a counter-clockwise direction as discussed hereinbefore so that the clock mechanism 42 is re-wound and the circuit again broken. When the circuit is closed and energized by the batteries 34, the solenoid 60 is, of course, energized and the stylus means 56 is actuated to strike the underside of the chart 18 as discussed hereinbefore. It will be understood that the circuit is broken so rapidly by virtue of the contacts 48 and 50 separating that the stylus means 56 will strike the chart 18 for only an instant and therefore only impress a dot or the like on the chart 18.

As the clock mechanism 42 unwinds the re-wind arm 46 moves in a clockwise direction until the contacts 48 and 50 engage again. Then the circuit is completed again and the cycle repeated.

It will thus be understood that the stylus means 56 only contacts the recording chart 18 periodically to indicate the temperature at that particular time. Thus the recording chart 18 is substantially freely rotatable and is not impeded by the resistance which would otherwise be imposed on it if the stylus means 56 rested on the chart 18. Accordingly, the chart 18 may be driven by the small clock mechanism 42. Furthermore, the mechanical clock mechanism 42 is continually and automatically re-wound and will, therefore, continue to operate for an indefinite length of time. The life of the batteries 34 which may be small nickel-cadmium batteries, determines the length of time the portable recorder 10 may operate. It should be noted that in accordance with the present invention the batteries are only in use periodically and then only for a short time interval and therefore the batteries will last a long time.

Referring to FIGURES 4–7 the apparatus employed in the recorder 10 will be described in greater detail. As illustrated in FIGURE 4 the mechanical clock mechanism 42 is mounted on the underside of the frame 22. The main portion of the clock mechanism 42 is positioned between plates 82 and 70 which are fixedly secured in spaced, parallel relationship to the frame 22. Interposed between the plate 82 and the frame 22 is a gear train assembly indicated generally by reference numeral 72. The clock mechanism 42 drives the chart 18 through the gear train assembly 72, which is illustrated in greater detail in FIGURES 6 and 7 and will be discussed in greater detail hereinafter. The re-wind mechanism of the clock mechanism 42 is positioned beneath the plate 70, including the re-wind arm means 46.

The mechanical clock mechanism 42 with the re-wind arm means 46 does not per se constitute a part of the present invention, as such clock mechanisms are well known in the art. Therefore a detailed discussion of the clock mechanism 42 is not necessary. Suffice it to say that the re-wind arm means 46 is actuated by a spring 74 to move in a clockwise direction when viewing FIGURE 4 to thereby drive the clock mechanism 42. Furthermore, a suitable ratchet arrangement, indicated generally by reference numeral 76, is provided in order that when the arm means 46 moves in a clockwise direction by virtue of the force of the spring 74 that it will drive the clock mechanism 42, but may move freely of the clock mechanism 42 in the counter-clockwise direction against the force of the spring 74 during re-winding.

As seen in FIGURE 4 the re-wind actuation means 44 is mounted beneath the plate 70. The solenoid 54 is fixedly mounted on the plate 70 whereby the pivotable actuation arm 52 is positioned to cooperate with the re-wind arm 46. The arm 52 is pivotally mounted at 78 upon a frame member 79 which supports the solenoid 54. The arm 52 is biased by a spring 80. When the solenoid 54 is energized upon engagement of the contacts 50 and 48, as discussed hereinbefore, the arm 52 is quickly pivoted about the pivot point 78 towards the solenoid 54. The arm 52 thereby forces the re-wind arm means 46 to rotate in a counter-clockwise direction when viewing FIGURE 4. The speed of the arm 46 gives it sufficient momentum to move a distance greater than the distance traveled by the arm 52. In this manner the contacts 50 and 48 are separated while simultaneously re-winding the clock mechanism 42. This, of course, breaks the electrical circuit as discussed hereinbefore.

It will be understood that the rotational movement of the actuation arm 52 is limited to the extent that it comes into contact with the solenoid 54. The re-wind actuation means 44 is likewise per se well known in the art and has commonly been employed with a mechanical clock mechanism 42 for re-winding purposes. A more detailed description of the re-wind actuation means is therefore not necessary.

Referring to FIGURES 6 and 7 the clock mechanism 42 has a rotating driven or output shaft 84. The torque of the output shaft 84 is utilized to drive the chart 18. However, the rotational speed of the shaft 84 is generally quite large in comparison to the rotational speed desired for the chart 18. For example, the output shaft 84 may make a complete revolution in one hour, while it is desired to have the chart 18 record the sensed condition for eight days, i.e., rotate through 360° in eight days. Accordingly, the clock mechanism 42 drives the chart 18 through the gear train assembly 72 which is adapted to transmit the torque from the output shaft 84 to the chart 18 at a substantially reduced rotational speed.

To these ends there is fixedly secured to the output shaft 84 a spur gear 86 which cooperates with another spur gear 88 fixedly secured to a rotatable shaft 90 mounted between the plate 82 and a plate 85. As the spur gear 86 is substantially larger than the spur gear 88 the rotational speed of the output shaft 84 is less than the rotational speed imparted to the shaft 90 by virtue of the cooperation between the spur gears 86 and 88. Also, fixedly secured to the shaft 90, and integral with the spur gear 88, is a smaller spur gear 92 which cooperates with a large spur gear 94 fixedly secured to another rotatable shaft 96 mounted between the plates 82 and 85. In this manner, the torque is transmitted from the shaft 90 to the shaft 96, the latter rotating however at a speed substantially less than the speed of the shaft 90. Also fixedly secured to the shaft 96 is a spur gear 100, which in this instance is integral with the gear 94. The spur gear 100 cooperates with a larger spur gear 102 fixedly secured to a rotatable shaft 98 supported by the plates 82 and 85. Accordingly, the torque is transmitted from the shaft 96 to the shaft 98, but the shaft 98 rotates at a reduced speed with respect to the shaft 96. The shaft 98 drives the chart 18 and to these ends has an internally threaded female member 102 on its free end which is adapted to threadably engage a knob 104 to secure the chart 18 to the shaft 98. As seen in FIGURE 7 the chart 18 is positioned between the frame 22 and the glass plate 20. Since the glass plate 20 does not rest on the chart 18 it is substantially freely rotatable in accordance with the movement of the shaft 98.

The gear train assembly 72 is therefore utilized to drive the chart 18 at the desired rotational speed depending upon the time period to be recorded on the chart 18. In this instance the chart 18 is an eight-day chart, but it will be understood that the gear train assembly may be modified to rotate the chart 18 at any desired speed by changing the relative sizes of the spur gears discussed hereinbefore.

Considering in greater detail the stylus means 56 and the stylus actuation means 40 reference is made to FIGURES 4 and 5. It will be seen that the frame 22 has an accurate slot 110 therein which exposes a portion of the underside of the chart 18. It is this exposed portion of the chart 18 which is contacted periodically by the stylus means 56. The stylus means 56 includes an arm 112 pivotally mounted upon a rotatable spring means 117 suitably secured to the underside of the frame 22. On one end of the stylus arm 112 there is mounted a stylus head 114 adapted to strike the underside of the chart 18 through the slot 110 in the frame 22. The other end of the stylus arm 112 has a counterbalancing weight 116 secured thereto to prevent any part of the stylus means 56 from resting on the chart 18 or the frame 22 when the stylus means 56 is in its normal position. In this manner the stylus arm 112 is generally free to pivot both transversely and laterally, the former when it moves to strike the chart 18 and the latter when it is responding to changes in temperature.

The lateral position of the stylus arm 112 with respect to the chart 18 is controlled by the bi-metallic temperature spiral indicated generally by reference numeral 58. Temperature spirals are well known in the art and therefore the temperature spiral 58 need not be described in detail. The temperature spiral 58 is mounted upon a supporting member 119 such that temperature variations sensed by the temperature spiral 58 will cause a shaft 120 to rotate in a clockwise or counter-clockwise direction (when viewing FIGURE 4) and thereby cause the stylus arm 112 to pivot in the same direction, since the shaft 120 is connected to the stylus arm 112. The particular manner in which the shaft 120 and the arm 112 are connected to allow the arm 112 to be pivoted both laterally and transversely does not per se constitute a part of the present invention, it being undertsood that this may be effected by any suitable means the selection of which would be within the ordinary skill of one in the art.

The solenoid 60 is fixedly secured to the supporting member 119 so that its associated, pivotable stylus actuation arm 62 is in position to cause the stylus arm 112 to be pivoted transversely when periodically recording. The arm 62 is biased by a spring 122 so that it is normally spaced from the stylus arm 112 as shown in FIGURE 5. When the solenoid 60 is, however, energized in the manner described hereinbefore, the arm 62 is pivoted about a point 124 causing the head 64 of the arm 62 to contact the stylus arm 112 whereby the stylus head 114 strikes the underside of the chart 18 exposed by the slot 110. It will be understood that the chart 18 is made of pressure sensitive paper so that the mark made on the underside of the chart 18 will appear on the front side also. When the solenoid 60 is de-energized, the arm 62 will return to its normal position, which is shown in FIGURE 5, thereby releasing the stylus arm 112 in order that the stylus head 114 will return to its normal position, i.e., spaced from the cart 18 as shown in FIGURE 5.

The electrical wires employed to connect the various components of the recorder 10 in the circuit discussed hereinbefore have not been illustrated to maintain clarity in the drawings. It will be understood that suitable insulation means are provided in order that when the circuit is energized the frame 22 and casing 12 will not likewise be energized.

Referring now to FIGURE 8, there is illustrated schematically a modification of the present invention employing a heat-sensitive paper chart 18a. In this instance, the recorder is identical to that described hereinbefore with the exception that the stylus head 114 is provided with an increment of resistance wire at its tip which contacts the chart 18a. This resistance wire is connected to the main circuit via electrical wires 200 and 202 in a parallel circuit so that when the main circuit is energized, as described hereinbefore to effect rewinding and striking of the chart 18a, the parallel circuit is also energized and the resistance wire heated. In this manner when the head 114 strikes the underside of the heat-sensitive chart 18a a mark visible on the front of the chart 18a will result.

It will be understood that in the embodiments described herein the solenoid 60 may be in a parallel circuit which is energized when the main circuit is completed by the engagement of contacts 50 and 48. Likewise the resistance wire may be in series with the main circuit. Furthermore, it will be understood that the recorder 10 may be modified in order that the stylus means 56 strikes the front side of the chart 18 without departing from the spirit of the present invention. Likewise it will be understood that a belt chart rather than the disc charts 18 and 18a may be used by modifying the means by which the charts 18 and 18a are held. The selection of such means would be within the ordinary skill of one in the art.

While the embodiments described herein are at present considered to be preferred it is understood that various modifications and improvements may be made therein and it is intended to cover in the appended claims all such modifications and improvements as fall within the true spirit and scope of the invention.

What is desired to be claimed and secured by Letters Patent of the United States is:

1. A recorder for recording on a chart a sensed condition which comprises a mechanical clock mechanism for driving said chart, re-wind means for re-winding said clock mechanism, re-wind actuation means to engage said re-wind means when said clock mechanism needs re-winding, means for recording on said chart said sensed condition, recording actuation means for actuating said recording means periodically to contact said chart and record said sensed condition thereon, said re-wind means, re-wind actuation means and recording actuation means forming an electrical circuit, said circuit being energized when said re-wind and re-wind actuation means engage.

2. The recorder of claim 1 wherein said electrical circuit is broken when said clock mechanism has been re-wound.

3. The recorder of claim 1 wherein said electrical circuit has a battery therein to energize said circuit when said re-wind and re-wind actuation means engage one another.

4. The recorder of claim 2 wherein said recording actuation means actuates said recording means to contact said chart when said electrical circuit is energized and allows said recording means to avoid contact with said chart when said circuit is not energized.

5. A recorder for recording on a chart a sensed condition which comprises a mechanical clock mechanism for driving said chart, said clock having re-wind means associated therewith, re-wind actuation means adapted to contact said re-wind means to re-wind said clock, a stylus means for recording on said chart, said stylus means being positioned by a sensing means, stylus actuation means adapted to contact said stylus means whereby recording is made on said chart, means for connecting said stylus actuation means, re-wind means and re-wind actuation means to form an electrical circuit, said electrical circuit being energized upon said re-wind actuation means and said re-wind means contacting one another.

6. The recorder of claim 5 wherein said electrical circuit is broken when said clock mechanism has been re-wound, said stylus actuation means being adapted to contact said stylus means when said circuit is energized and allowing said stylus means to be in a non-engaging position with respect to said chart when said circuit is de-energized.

7. The recorder of claim 6 wherein said recorder includes a casing and a frame resiliently mounted therein, said stylus means, stylus actuation means and clock mechanism being secured to said frame.

8. The recorder of claim 7 wherein a gear train assembly transmits torque from said clock mechanism to drive said chart at a predetermined speed.

9. A recorder for recording any sense condition which comprises a chart driven by a mechanical clock mechanism, said clock mechanism having re-wind means associated therewith, stylus means adapted to be normally in spaced relationship with said chart, re-wind actuation means to engage said re-wind means when said clock mechanism needs re-winding, recording actuation means for actuating said stylus means to strike said chart, said rewind means and said re-wind actuation and recording actuation means being electrically connected to form an electrical circuit being energized by a battery when said rewind actuation means and said re-wind means engage whereby simultaneous re-winding of said clock mechanism and recording by said stylus means on said chart is effected, said circuit being broken upon said clock mechanism being re-wound whereby said stylus means returns to its normal position.

10. The recorder of claim 9 wherein said stylus means has a heating element therein, said heating element being connected to said circuit whereby said element is heated when said circuit is energized.

References Cited in the file of this patent

UNITED STATES PATENTS

| | | |
|---|---|---|
| 410,664 | Brewster | Sept. 10, 1889 |
| 1,061,607 | Goss et al. | May 13, 1913 |
| 1,517,652 | Quarles | Dec. 2, 1924 |
| 2,935,160 | Lawson | May 3, 1960 |